United States Patent
Karst

(10) Patent No.: US 11,985,918 B2
(45) Date of Patent: May 21, 2024

(54) OBSTACLE DETECTION AND FIELD MAPPING FOR A WORK VEHICLE

(71) Applicant: DEERE & COMPANY, Moline, IL (US)

(72) Inventor: Austin J. Karst, Ottumwa, IA (US)

(73) Assignee: DEERE & COMPANY, Moline, IL (US)

( * ) Notice: Subject to any disclaimer, the term of this patent is extended or adjusted under 35 U.S.C. 154(b) by 847 days.

(21) Appl. No.: 17/008,300

(22) Filed: Aug. 31, 2020

(65) Prior Publication Data

US 2022/0061211 A1    Mar. 3, 2022

(51) Int. Cl.
| | | |
|---|---|---|
| A01D 34/00 | (2006.01) | |
| A01D 34/04 | (2006.01) | |
| A01D 34/24 | (2006.01) | |
| F15B 15/14 | (2006.01) | |
| G01C 21/00 | (2006.01) | |

(52) U.S. Cl.
CPC ........... *A01D 34/008* (2013.01); *A01D 34/04* (2013.01); *A01D 34/246* (2013.01); *G01C 21/3826* (2020.08); *F15B 15/14* (2013.01)

(58) Field of Classification Search
CPC .... A01D 34/008; A01D 34/04; A01D 34/246; G01C 21/3826; F15B 15/14
See application file for complete search history.

(56) References Cited

U.S. PATENT DOCUMENTS

| | | | |
|---|---|---|---|
| 8,863,484 B2 * | 10/2014 | Patterson | A01D 41/145 |
| | | | 56/10.2 R |
| 10,064,328 B2 * | 9/2018 | Henson | A01D 34/006 |
| 2001/0016788 A1 | 8/2001 | Brimeyer et al. | |
| 2016/0360697 A1 * | 12/2016 | Diaz | B60W 50/085 |
| 2018/0042173 A1 * | 2/2018 | Henson | A01D 69/02 |
| 2018/0042176 A1 * | 2/2018 | Obropta | G06T 7/55 |
| 2018/0047177 A1 * | 2/2018 | Obropta | G06T 17/20 |
| 2019/0041973 A1 * | 2/2019 | Maheshwari | H04L 12/2803 |
| 2019/0327893 A1 * | 10/2019 | Hamilton | A01D 41/141 |
| 2020/0337240 A1 | 10/2020 | Hauwiller et al. | |
| 2020/0375107 A1 * | 12/2020 | Duerksen | A01D 57/20 |

* cited by examiner

*Primary Examiner* — Abigail A Risic
(74) *Attorney, Agent, or Firm* — Michael Best & Friedrich LLP

(57) ABSTRACT

A work machine includes a chassis, and a work implement movably coupled to the chassis and configured to perform a field-engaging function. The work machine also includes an actuator coupled to the work implement and configured to adjust a position of the work implement relative to a ground surface. The work machine further includes a sensor unit configured to sense a characteristic of the work machine and communicate a signal indicative of the characteristic. The work machine also includes a communication module, and a controller in communication with the sensor unit and the communication module, the controller including a processor and memory. The controller is configured to monitor a location of the work machine, process the signal from the sensor unit to monitor the characteristic, determine whether the characteristic exceeds an acceptable range, and if so, identify an event, and assign a location to the event.

18 Claims, 15 Drawing Sheets

OBSTACLE DETECTION AND FIELD MAPPING FOR A WORK VEHICLE

FIELD

The present disclosure relates to a work implement adjustment system for a work vehicle.

BACKGROUND

Many industrial work machines, such as farming equipment, use hydraulics to control various moveable implements. The operator is provided with one or more input or control devices operably coupled to one or more hydraulic actuators, which manipulate the relative location of select components or devices of the equipment to perform various operations. For example, windrowers may be utilized in cutting crops. A windrower may include a header attachment pivotally coupled to a chassis. One or more hydraulic cylinders are coupled to the header attachment and move the header attachment between positions relative to the chassis.

SUMMARY

In one embodiment, the disclosure provides a work machine that includes a chassis, and a work implement movably coupled to the chassis, the work implement configured to perform a field-engaging function. The work machine also includes an actuator coupled to the work implement and configured to adjust a position of the work implement relative to a ground surface. The work machine further includes a controller in communication with a sensor unit and a communication module. The controller is configured to monitor a location of the work machine via the communication module. The controller is also configured to at least one of: (1) receive a signal from the sensor unit indicative of a load acting on the actuator, determine whether the load exceeds an acceptable load range, and in response to the load exceeding the acceptable load range, identify an event, or (2) receive a signal from the sensor unit indicative of an acceleration of the work implement, determine whether the acceleration of the work implement exceeds an acceptable acceleration range, and in response to the acceleration of the work implement exceeding the acceptable acceleration range, identify an event. The controller is further configured to assign a location to the event, and store the event and the assigned location in a field map database.

In another embodiment, the disclosure provides a work machine that includes a chassis, and a work implement movably coupled to the chassis, the work implement configured to perform a field-engaging function. The work machine also includes an actuator coupled to the work implement and configured to adjust a position of the work implement relative to a ground surface. The work machine further includes a sensor unit configured to sense a characteristic of the work machine and communicate a signal indicative of the characteristic. The work machine also includes a communication module, and a controller in communication with the sensor unit and the communication module. The controller is configured to monitor a location of the work machine via the communication module, and process the signal from the sensor unit to monitor the characteristic. The controller is also configured to determine whether the characteristic exceeds an acceptable range, and in response to the characteristic exceeding the acceptable range, identify an event, and assign a location to the event. The characteristic includes one or more of a load acting on the actuator, an acceleration of the work implement, and an acceleration of a component that couples the work implement to the chassis.

In another embodiment, the disclosure provides a control system for a work machine. The work machine includes a chassis, a work implement movably coupled to the chassis, the work implement configured to perform a field-engaging function, and an actuator coupled to the work implement and configured to adjust a position of the work implement relative to a ground surface. The control system includes a sensor unit configured to sense a characteristic of the work machine and communicate a signal indicative of the characteristic. The control system also includes a communication module, and a controller in communication with the sensor unit and the communication module. The controller is configured to monitor a location of the work machine via the communication module, and process the signal from the sensor unit to monitor the characteristic. The controller is also configured to determine whether the characteristic exceeds an acceptable range, and in response to the characteristic exceeding the acceptable range, identify an event, and assign a location to the event. The characteristic includes one or more of a pressure of a load acting on the actuator, an acceleration of the work implement, and an acceleration of a component that couples the work implement to the chassis.

Other aspects of the disclosure will become apparent by consideration of the detailed description and accompanying drawings.

BRIEF DESCRIPTION OF THE DRAWINGS

FIG. 10 is a graph showing an acceleration for the header.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways.

Figure 1:
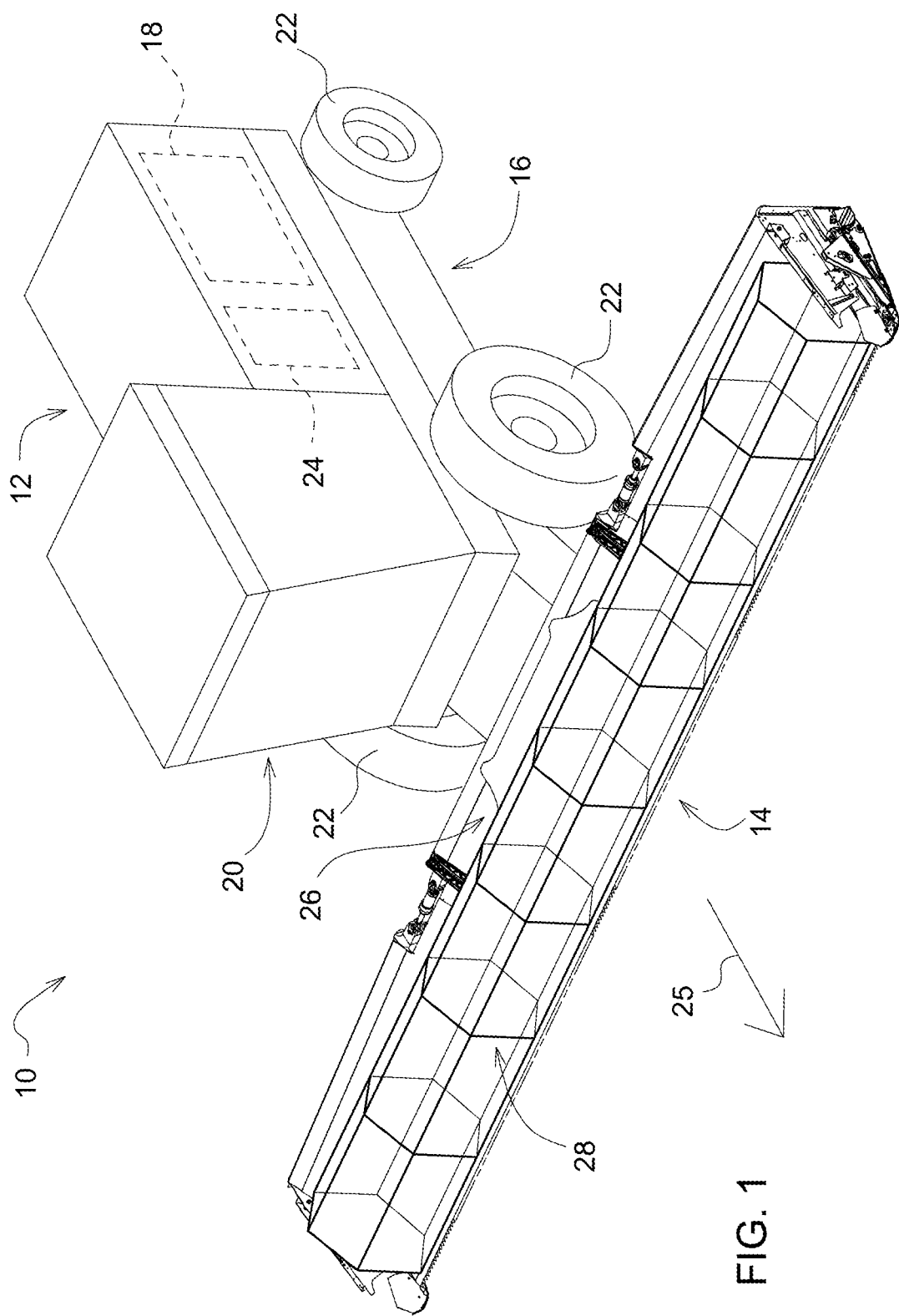
FIG. 1 is a perspective view of a windrower.

FIG. 1 illustrates an embodiment of a work machine depicted as a self-propelled windrower 10. The present disclosure is not limited, however, to a windrower and may extend to other industrial machines such as, e.g., a combine harvester, or any other work machine. As such, while the figures and forthcoming description may relate to a windrower, it is to be understood that the scope of the present disclosure extends beyond a windrower and, where applicable, the term "machine" or "work machine" will be used instead. The term "machine" or "work machine" is intended to be broader and encompass other vehicles besides a windrower for purposes of this disclosure.

The illustrated windrower 10 includes a tractor 12 and a work implement such as a header 14 coupled to the tractor 12. The header 14 is configured to perform a field-engaging function in a field. For example, in some embodiments, the header 14 may be configured to cut crops in a field (e.g., hay, small grain crops, etc.). In other embodiments, the work implement may be configured to gather crops that are already cut, to till the field, to plant seeds in the field, and the like. In such embodiments, the work implement may comprise a header for a cotton harvester, a combine, a forage harvester, a sugar cane harvester, and the like. The work implement may also comprise a feed system for a bailer, or seeding or tillage equipment. The systems and methods for obstacle detection and field mapping described herein with regard to the header 14 of the windrower 10 are likewise applicable to these and other work implements.

The tractor 12 includes a chassis 16, a prime mover 18, an operator cab 20, a plurality of ground-engaging devices 22, and a control system 24. The prime mover 18 is configured to move the tractor 12 in a direction of travel 25 via the ground engaging devices 22. The illustrated ground-engaging devices 22 are wheels, but tracks or other suitable ground-engaging devices can be utilized. The chassis 16 supports the prime mover 18 and the control system 24. The prime mover 18 can include an engine, such as a diesel engine, and the control system 24 can include a vehicle control unit (VCU).

A vehicle operation system (not shown) is positioned in the cab 20 and can include different combinations of a steering wheel, control levers, joysticks, control pedals, control buttons, control displays, and other input devices. The operator can actuate one or more controls of the vehicle operation system for purposes of operating movement of the windrower 10 and the different components of the header 14.

Figure 2:
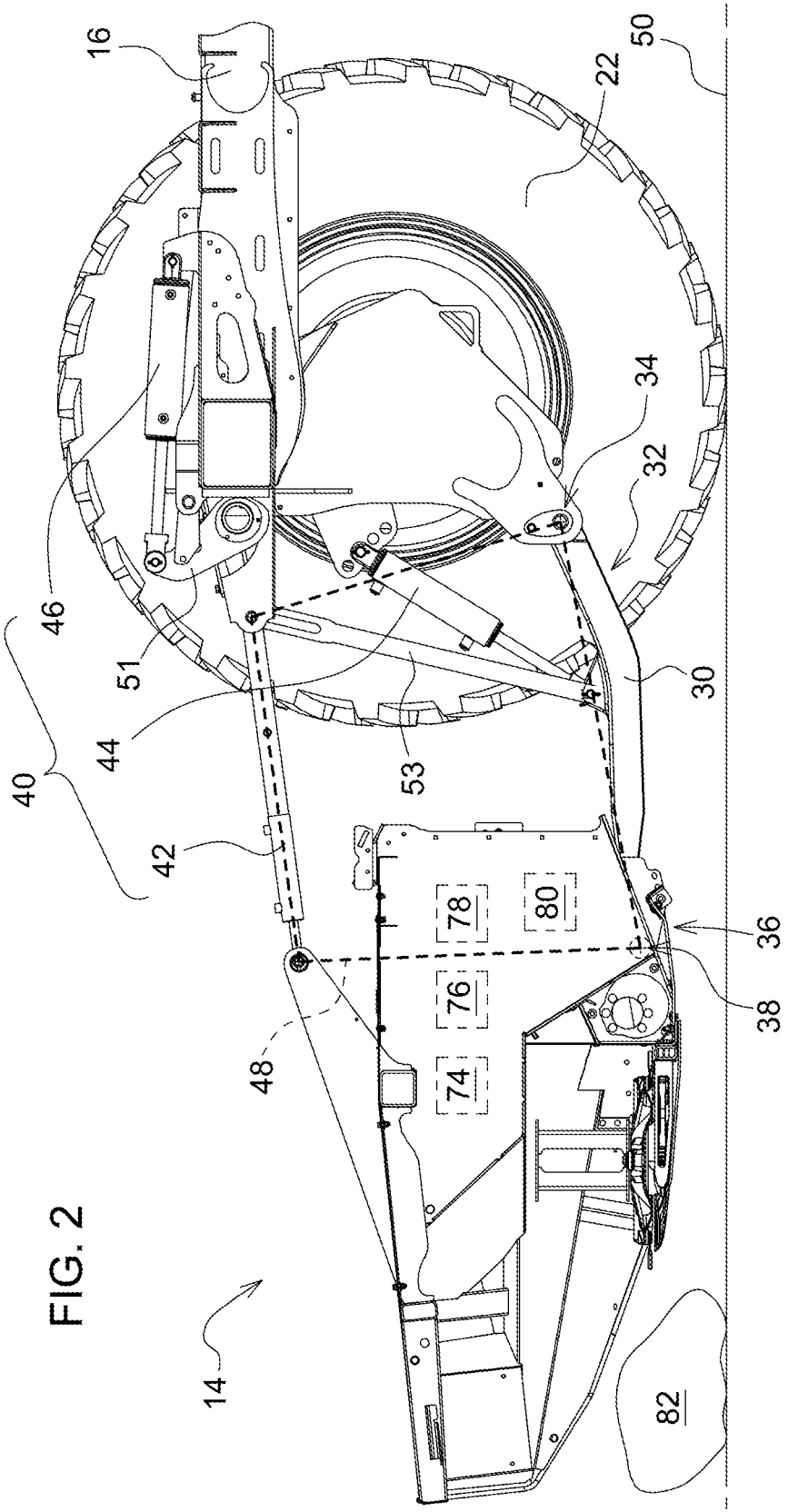
FIG. 2 is a schematic side view of a header of the windrower of FIG. 1.
Figure 3:
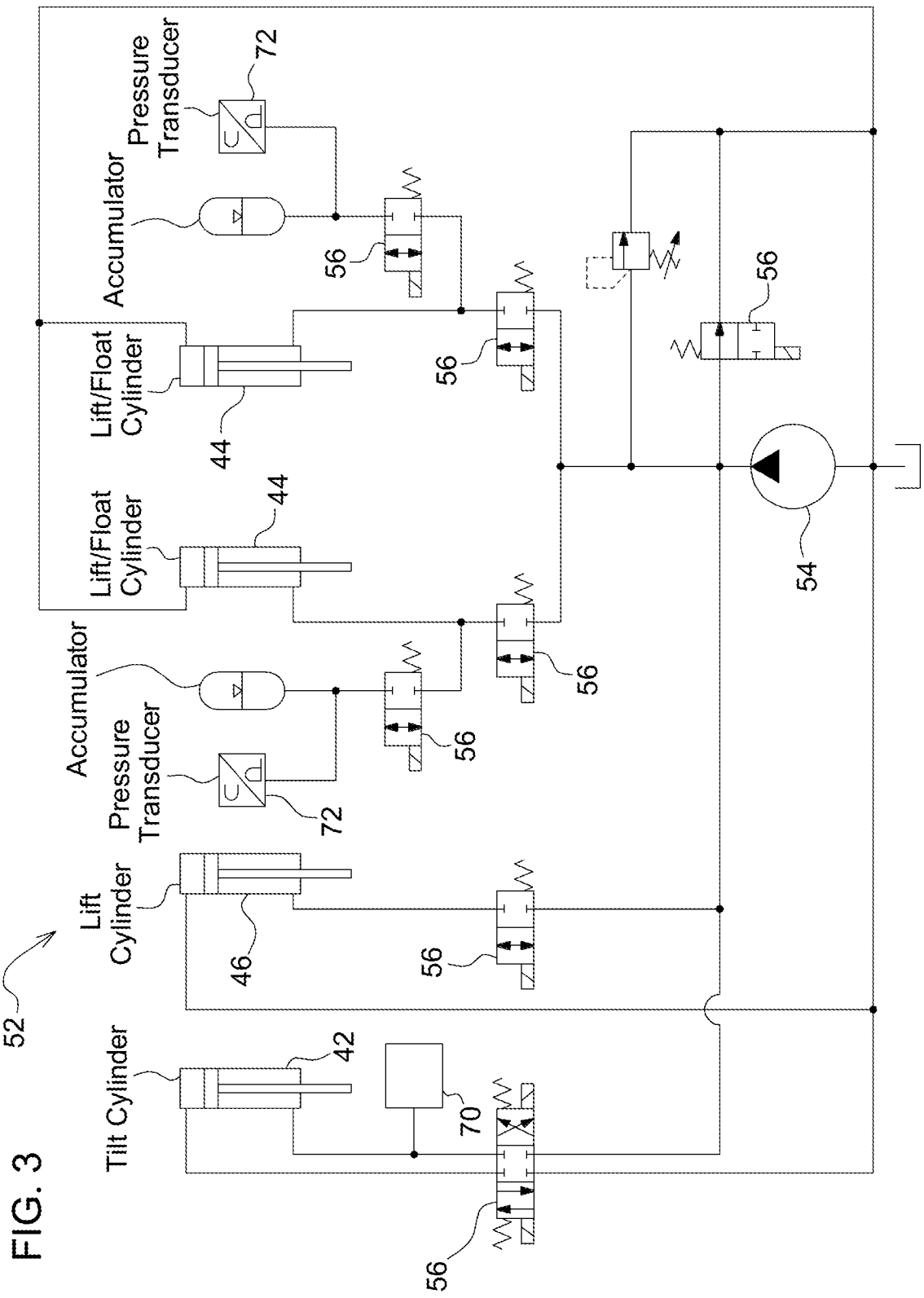
FIG. 3 is a schematic of a hydraulic system for the windrower of FIG. 1.

With reference to FIGS. 2 and 3, the header 14 includes a frame 26, and a cutter bar 28 coupled to the frame 26 and operably coupled to the prime mover 18. The prime mover 18 powers the cutter bar 28 to perform a cutting operation to cut crops in a field (e.g., hay, small grain crops, etc.). The header 14 is moveably connected to the chassis 16 by one or more arms 24 (only one being shown in FIG. 2) having a first end 32 pivotably coupled to the chassis 16 at a first pivot location 34, and a second end 36 pivotably coupled to the header 14 at a second pivot location 38.

The header 14 is further coupled to the chassis 16 by a plurality of actuators 40. The actuators 40 are operable to adjust the position and the orientation of the header 14 relative to the chassis 16. In some constructions, the actuators 40 can include hydraulic cylinders, electric motorized actuators, mechanical spring assemblies, and the like. In the embodiment illustrated in FIGS. 2 and 3, the actuators 40 include a tilt cylinder 42, one or more float cylinders 44, and a lift cylinder 46. The arms 30, the header 14, the tilt cylinder 42, and the chassis 16 form a four-bar linkage 48.

The tilt cylinder 42 is configured as a single double-acting hydraulic tilt cylinder 42 that extends or retracts to adjust a tilt angle defined between the cutter bar 28 and a ground surface 50, and thereby makes refinements in a cut height of the crop being cut. Specifically, actuation of the tilt cylinder 42 causes the cutter bar 28 to pivot relative to the arms 30 about the second pivot location 38.

The float cylinders 44 (only one is shown in FIG. 2) are configured as single-acting hydraulic float cylinders 44 that connect the chassis 16 and the arms 30. The float cylinders 44 at least partially support a weight of the header 14, and actuation of the float cylinders 44 tends to cause the arms 30 to pivot relative to the chassis 16 about the first pivot location 34. In the construction illustrated in FIGS. 2 and 3, the windrower 10 includes two float cylinders 44 that support the weight of the header 14 and enable the header 14 to follow the ground surface 50 over changing terrain. Moreover, in the construction illustrated in FIGS. 2 and 3, the lift cylinder 46 is a separate component from the float cylinders 44 that is coupled between the chassis 16 and a rockshaft 51 pivotably coupled to the chassis 16. In turn, the rockshaft 51 is coupled to the arms 30 via a slotted lift link 53. The lift cylinder 46 is configured to extend or retract to lower or raise the header 14 relative to the ground surface 50.

FIG. 3 illustrates a partial schematic of an embodiment of a hydraulic system 52 configured to supply fluid to implements of the windrower 10, including the actuators 40 comprising the tilt cylinder 42, the float cylinders 44, and the lift cylinder 46. A basic layout of a portion of the hydraulic system 52 is shown for clarity and one of ordinary skill in the art will understand that different hydraulic, mechanical, and electrical components can be used depending on the machine and the moveable implements.

The hydraulic system 52 includes at least one pump 54 that supplies fluid, for example hydraulic oil, to one or more downstream components. The pump 54 can be capable of providing an adjustable output, for example a variable displacement pump or variable delivery pump. Although only a single pump 54 is shown, two or more pumps may be used depending on the requirements of the system and the work machine.

In the illustrated embodiment, the hydraulic system also includes a plurality of valves 56 in fluid communication with the pump 54 such that the pump 54 delivers fluid to valves 56. In some embodiments, the valves 56 are electrohydraulic valves that receive the hydraulic fluid from the pump 54 and control the delivery of the hydraulic fluid to the actuators 40 including the tilt cylinder 42, the float cylinders 44, and the lift cylinder 46.

Figure 4:
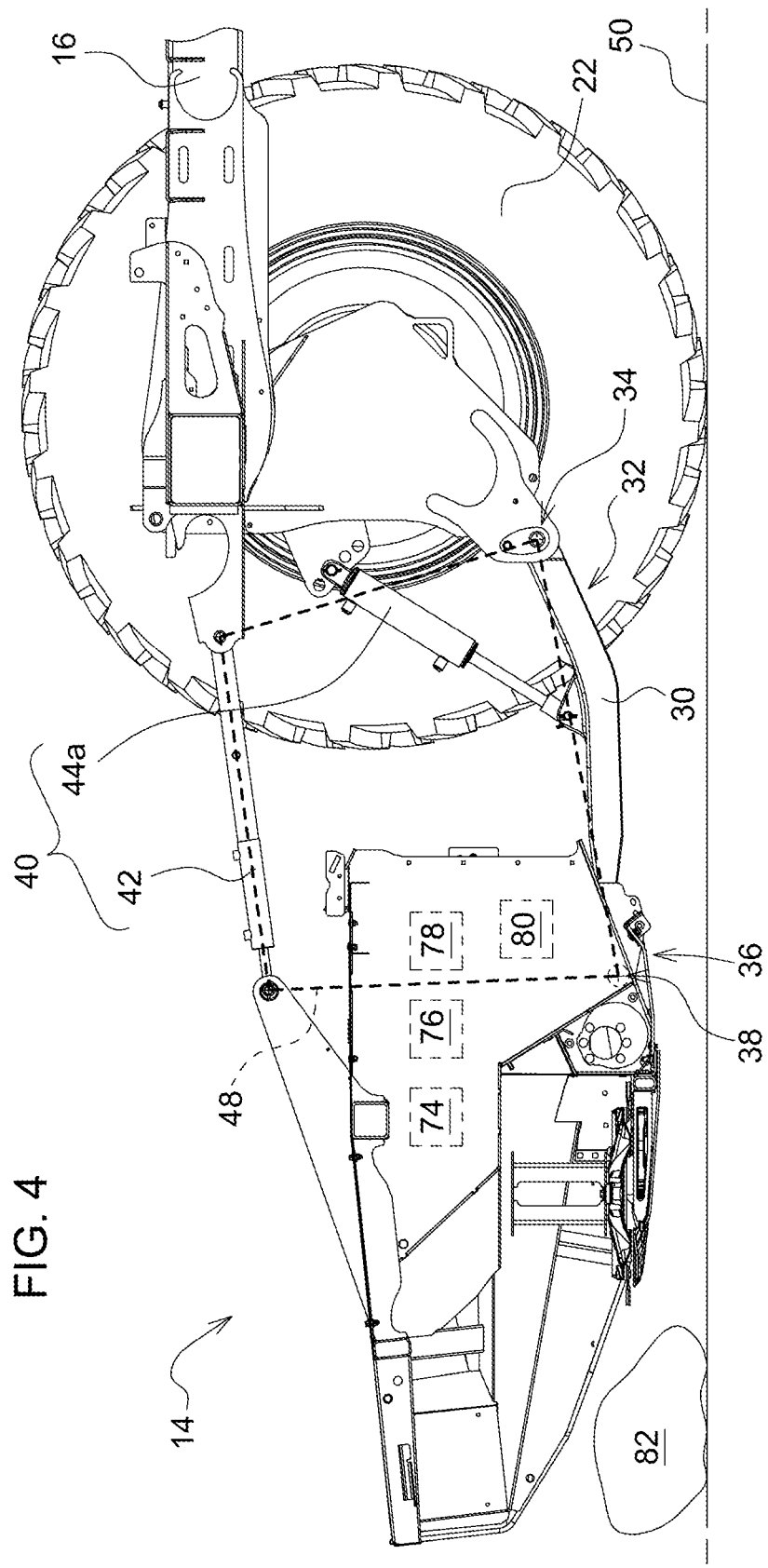
FIG. 4 is a schematic side view of a header of the windrower of FIG. 1 according to another embodiment.
Figure 5:
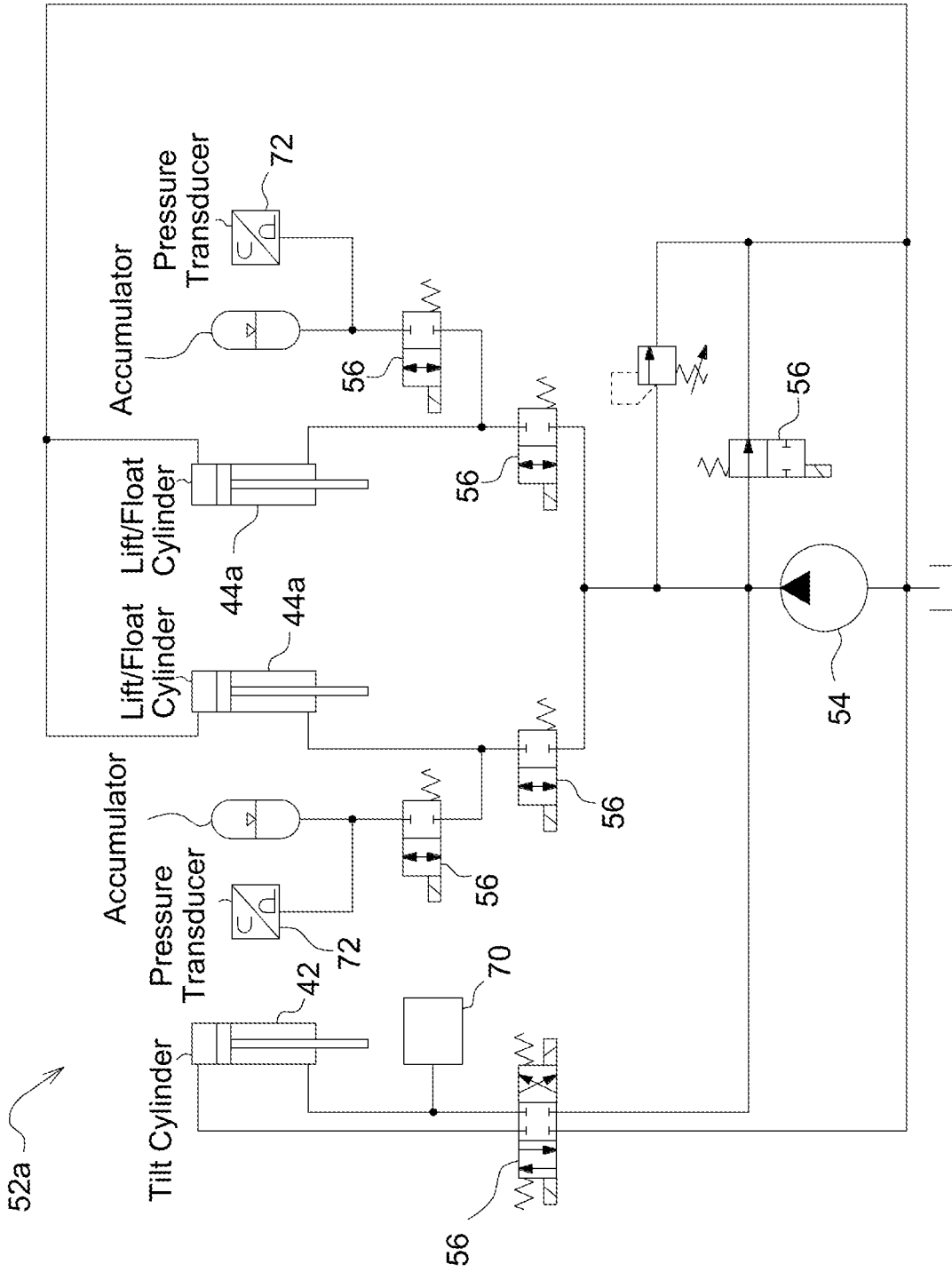
FIG. 5 is a schematic of a hydraulic system for the windrower of FIG. 1 according to another embodiment.

FIGS. 4 and 5 illustrate another embodiment of the windrower 10. The embodiment illustrated in FIGS. 4 and 5 includes the same elements previously described with respect to the embodiment of FIGS. 2 and 3, except that the embodiment of FIGS. 4 and 5 includes a hydraulic system 52a that differs from the hydraulic system 52 described above. Specifically, the hydraulic system 52a does not include a separate lift cylinder. Instead, the hydraulic system 52a includes a pair of combination float and lift cylinders 44a configured to support the weight of the header 14 to enable the header to follow the ground surface 50 over changing terrain, and they are further configured to raise or lower the header 14 relative to the ground surface 50. The combination float and lift cylinders 44a of the hydraulic system 52a perform the combined functions of both the float cylinders 44 and the tilt cylinder 42 of the hydraulic system 52 described above in connection with FIGS. 2 and 3.

Figure 6:
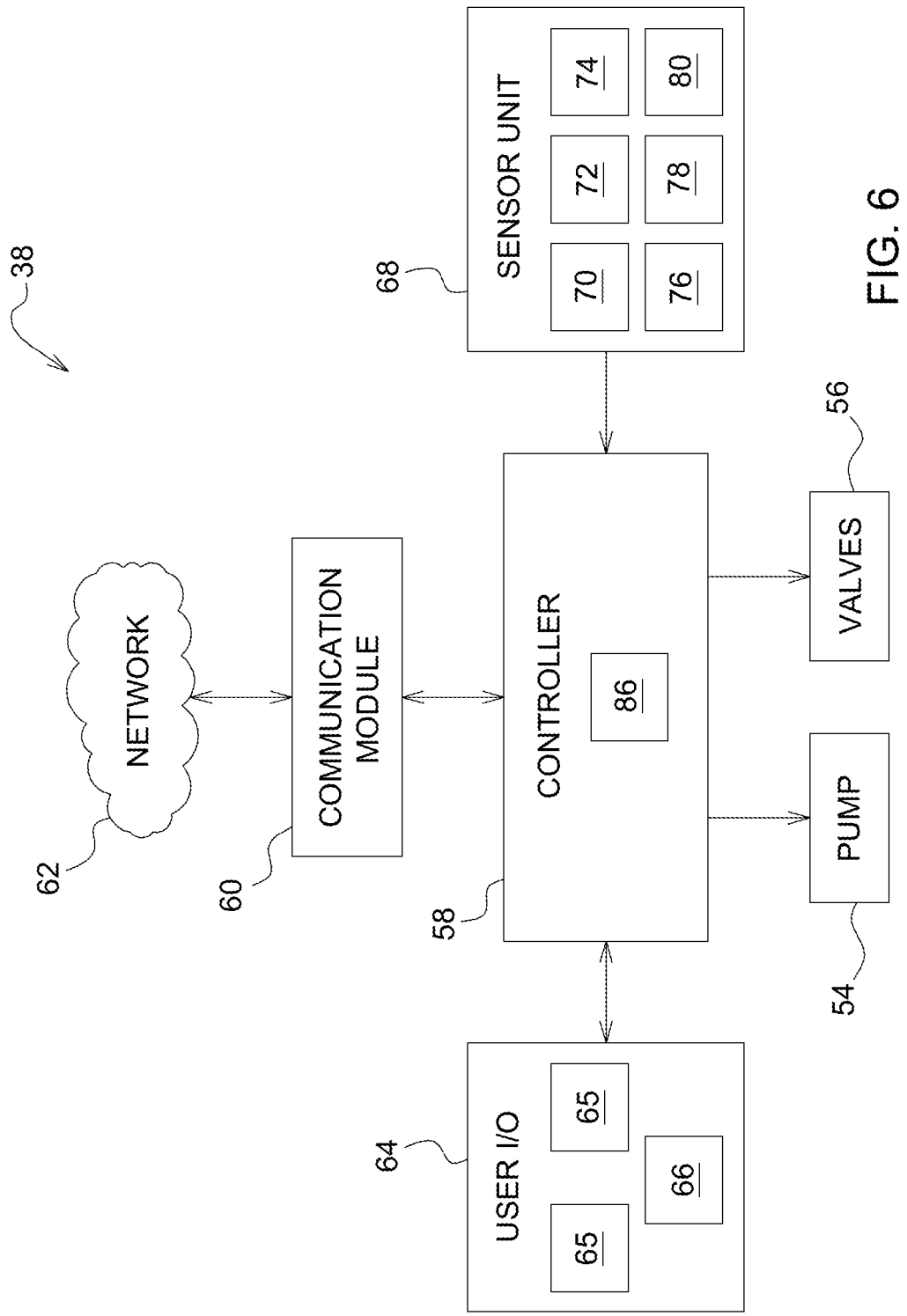
FIG. 6 is a schematic of a control system for the windrower of FIG. 1

FIG. 6 illustrates an embodiment of the control system 24 that is configured to control the operation of various components of the windrower 10, including either of the hydraulic systems 52 and 52a described above. The control system 24 includes a controller 58 with a plurality of inputs and outputs that are operable to receive and transmit information and commands to and from different components in the windrower 10. Communication between the controller 58 and the different components can be accomplished through a CAN bus, another communication link (e.g., wireless transceivers), or through a direct connection. The control system 24 also includes a communication module 60 configured to connect to and communicate with other devices (e.g., a computer, another work machine, etc.) through a network 62. The network 62 can be, for example, a wide area network ("WAN") (e.g., a global positioning system ("GPS"), a TCP/IP based network, a cellular network, etc.).

The control system 24 further includes a user input/output module 64 that includes one or more operator input mechanisms 65 in communication with the controller 58. The one or more operator input mechanisms 65 can include, for example, a joystick, throttle control mechanism, pedal, lever, switch, or other control mechanism. The operator input mechanisms 65 are located within the cab 20 of the windrower 10 and can be used to control the position of the header 14 by adjusting the hydraulic actuators 40. The user input/output module 64 can also include one or more input/output mechanisms such as, for example, a touch screen display device such as a control screen 66 (FIG. 17) located in the cab 20.

The controller 58 includes memory for storing software, logic, algorithms, programs, a set of instructions, etc. for controlling the valves 56 and other components of the windrower 10. The controller 58 also includes a processor for carrying out or executing the software, logic, algorithms, programs, set of instructions, etc. stored in the memory. The memory can store look-up tables, graphical representations of various functions, and other data or information for carrying out or executing the software, logic, algorithms, programs, set of instructions, etc.

The controller 58 is in communication with the valves 56 and can send control signals to the valves 56 and to the pump 54 to adjust the output or flowrate to the actuators 40 including the tilt cylinder 42, the float cylinders 44, and the lift cylinder 46, or in some embodiments, the combination float and lift cylinders 44a. The types of control signals and how the valves 56 are adjusted will vary dependent on the system. For example, one or more of the valves 56 can be an electrohydraulic servo valve that adjusts the flow rate of hydraulic fluid to the actuators 40 based on the received control signal.

A sensor unit 68 comprising one or more sensors can be associated with the actuators 40 or other components of the header 14. The sensor unit 68 can detect information relating to the header 14 and provide the detected information to the controller 58. For example, one or more sensors can detect information relating to actuator position, load experienced by the actuator, cylinder pressure, fluid temperature, or movement speed of the actuators, as well as header position or acceleration, or characteristics of the ground surface 50. Although described as a single unit related to the header 14, the sensor unit 68 can encompass sensors positioned at any position within the windrower 10 or associated with the windrower 10 to detect or record operating information.

With reference to FIG. 6, the sensor unit 68 includes a tilt pressure sensor 70 in communication with the tilt cylinder 42, and float pressure sensors 72 in communication with the float cylinders 44. The pressure sensors 70, 72 are used to measure the load on the tilt cylinder 42 and in the float cylinders 44, respectively. In some embodiments, the pressure sensors 70, 72 are pressure transducers.

FIGS. 2, 4, and 6 show a tilt position sensor 74 associated with the sensor unit 68. The tilt position sensor 74 is configured to detect or measure the tilt position of the header 14 relative to the chassis 16 and transmit that information to the controller 58. The tilt position sensor 74 can be configured to directly measure the tilt position of the header 14 or to indirectly measure the tilt position of the header 14 by the position or movement of the tilt cylinder 42. In one embodiment, the tilt position sensor 74 can be a rotary position sensor that measures the tilt position of the header 14 relative to the chassis 16. In another embodiment, the tilt position sensor 74 can be an in-cylinder position sensor that directly measures the position of the hydraulic piston in the tilt cylinder 42.

With reference to FIGS. 2, 4, and 6, the sensor unit 68 may also include one or more header height sensors 76 configured to detect or measure the height of the header 14 relative to the ground surface 50 and transmit that information to the controller 58. The header height sensors 76 can be configured to directly measure the height of the header 14 relative to the ground surface 50. Or, the header height sensors 76 can be configured to indirectly measure the height of the header 14 by the position or movement of the float cylinders 44, the tilt cylinder 42, or, in the embodiment shown in FIGS. 4 and 5, the combination float and lift cylinders 44a. In one embodiment, the header height sensors 76 can be rotary position sensors that measure the height of the header 14 relative to the chassis 16. In another embodiment, the header height sensors 76 can be in-cylinder position sensors that directly measure the position of the hydraulic piston in the tilt cylinder 42, or in each respective float cylinder 44 or in each respective combination float and lift cylinder 44a.

With reference to FIGS. 2, 4, and 6, in some embodiments, the sensor unit 68 can include an accelerometer 78 coupled to the header 14. The accelerometer 78 is configured to detect or measure the acceleration of the header 14 and transmit that information to the controller 58. In some embodiments, the accelerometer 78 can detect or measure the acceleration of a component that couples the header 14 to the chassis 16, such as the arms 24, the actuators 40, or other members or linkages. In the same or other embodiments, the sensor unit 68 can include a camera 80 coupled to the windrower 10. The camera 80 can be forward, side, or rearward facing. Additional sensors may be associated with the sensor unit 68 and one or more additional sensor units can be incorporated into the control system 24.

During operation, an operator drives the windrower 10 along rows in a field. The operator manipulates the one or more input mechanisms 65 to adjust the position and operation of the header 14, including the header height, the header tilt, and the header float pressure. If the windrower 10 encounters changes in the ground surface 50, such as obstacles 82 (FIGS. 2 and 4) or undulating terrain, the operator can make adjustments to overcome these changes using the input mechanisms 65 or the control screen 66.

Figure 16:
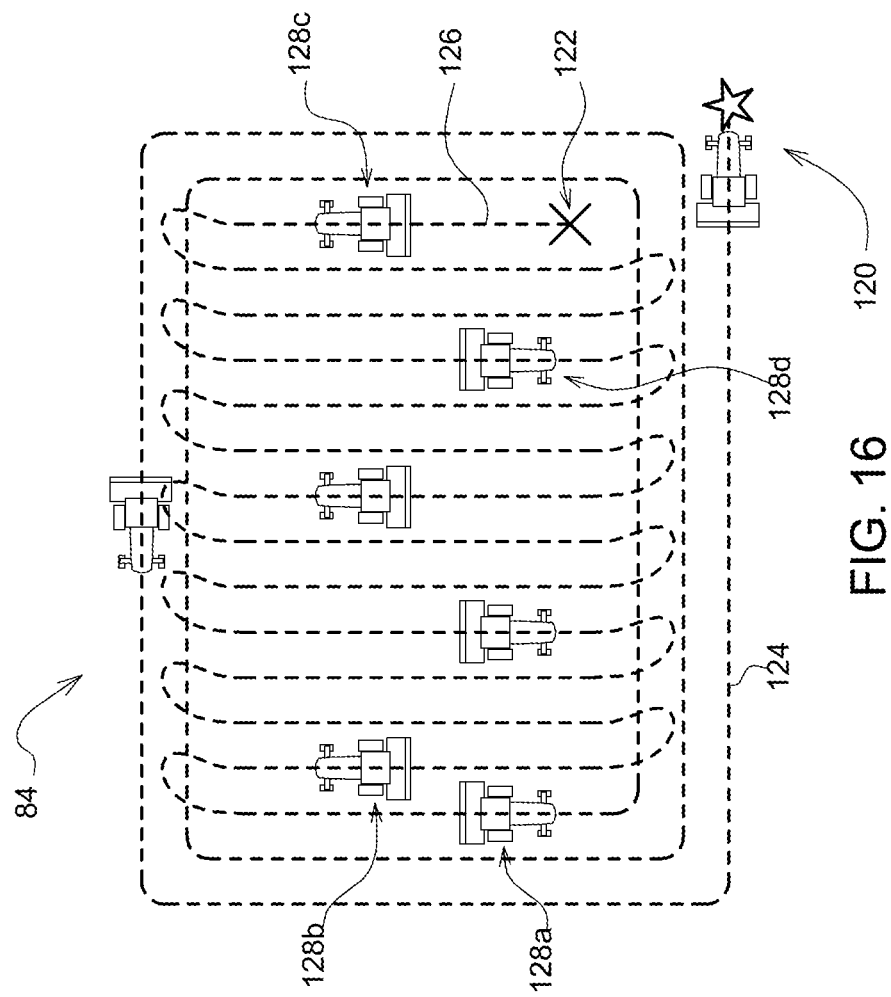
FIG. 16 is a schematic field map generated by the obstacle detection and field mapping module.

FIG. 16 illustrates one embodiment of a field map 84 generated by the controller 58 during operation of the windrower 10, which can be displayed on, e.g., the control screen 66 (FIG. 17) in the cab 20. According to one embodiment, the controller 58 is configured to detect changes in the ground surface 50, such as obstacles 82 or undulated terrain, and provide a report or map to the work machine, the operator, or a farm manager for future use. The controller 58 includes an obstacle detection and mapping module 86 that includes instructions that will detect these obstacles and changes in terrain based on signals transmitted to the controller 58 from the sensor unit 68. The instructions can also monitor the location of the windrower 10, stitch location information, such as a geotag or GPS coordinates, to the detected obstacle or change in terrain, and store the information in a database. The instructions can also generate a report or field map that includes the detected obstacles or changes in terrain and their respective locations. The obstacle detection and mapping module 86 can be turned on or off by an operator, for example through operation of a switch or control screen input in the cab 20.

Figure 7:
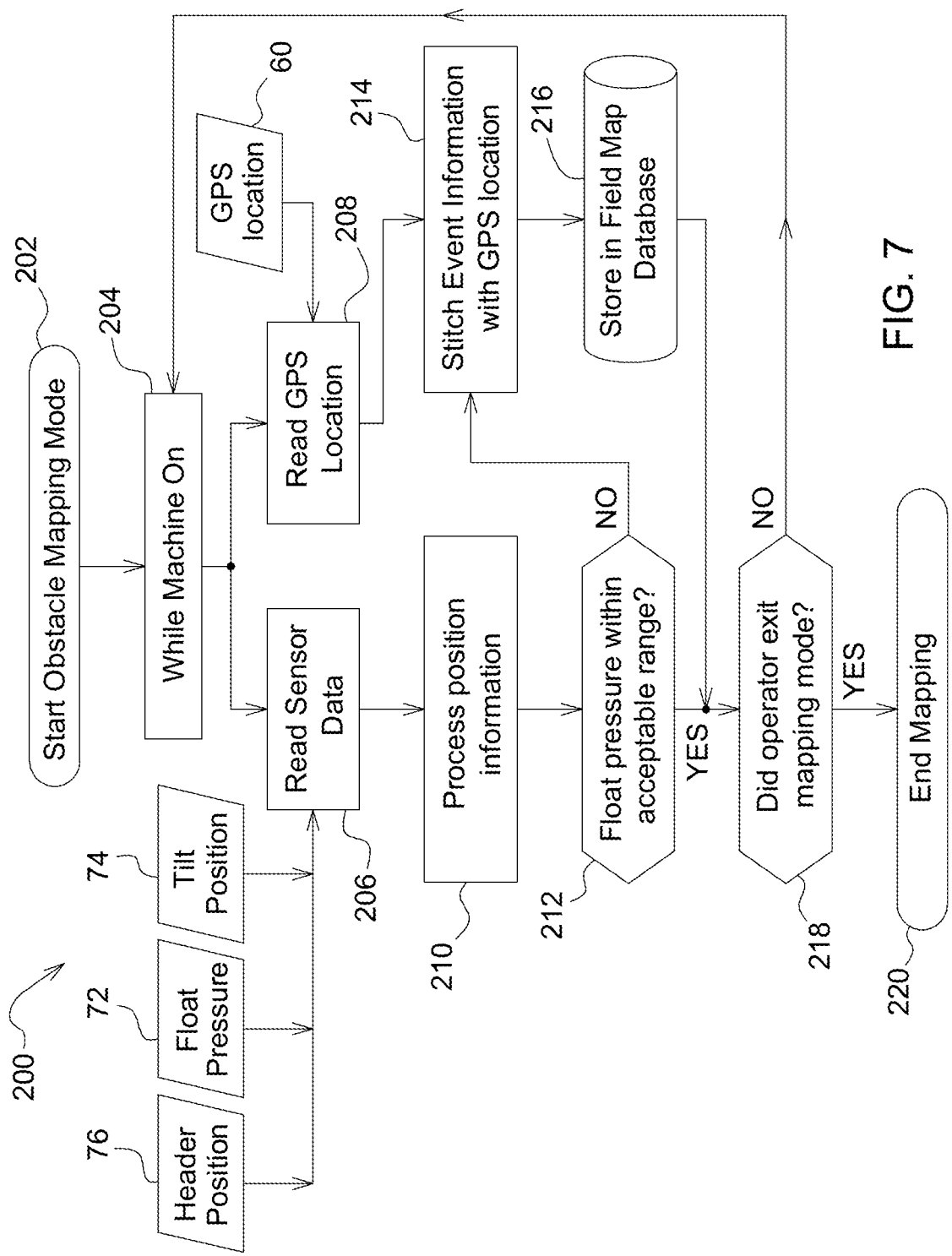
FIG. 7 is a flow chart of an obstacle detection and field mapping module for the control system.

FIG. 7 shows a partial flow diagram of a first set of instructions 200 to be executed by the controller 58 for detecting changes in the ground surface 50, such as obstacles 82 (FIG. 2) and undulating terrain, and providing a report or map, such as the field map 84 (FIG. 16). The controller 58 initially receives a start command to initiate an obstacle detection and mapping mode (step 202), e.g., via a switch or control screen input from the operator, and checks to verify that the windrower 10 is on (step 204). If the windrower 10 is on, the controller 58 reads signals received from the sensor unit 68 (step 206). The signals may include a header height detected or measured by one or more of the header height sensors 76, a float pressure detected by one or more of the float pressure sensors 72, and a header tilt position detected or measured by the tilt position sensor 74. Simultaneous to step 206, the controller 58 also monitors a GPS location of the windrower 10 (step 208) (e.g., supplied to the controller 58 via the communication module 60). The controller 58 then processes the signals to determine a header location and acceleration (step 210). Specifically, the controller 58 processes the signals from the tilt position sensor 74 and the one or more header height sensors 76 to determine the header location and orientation relative to the ground surface 50. Next, the controller 58 determines whether the detected float pressure is within an acceptable range for a given float pressure setting (set by the operator), tilt position, header height, and header type (step 212). The acceptable range may be determined by the controller 58 based at least in part on the signals received from the sensor unit 68. If the controller 58 determines that the detected float pressure has moved outside the acceptable range, the controller 58 creates an event and stitches the event information with the GPS location (step 214) and stores the information in a field map database (step 216). If the controller 58 determines that the detected float pressure remains within the acceptable range, the controller 58 checks for a stop command from the operator (step 218), and if a stop command was issued, the controller 58 ends the obstacle detection and mapping mode (step 220). If no stop command was issued, the controller 58 repeats steps 204-218.

Figure 8:
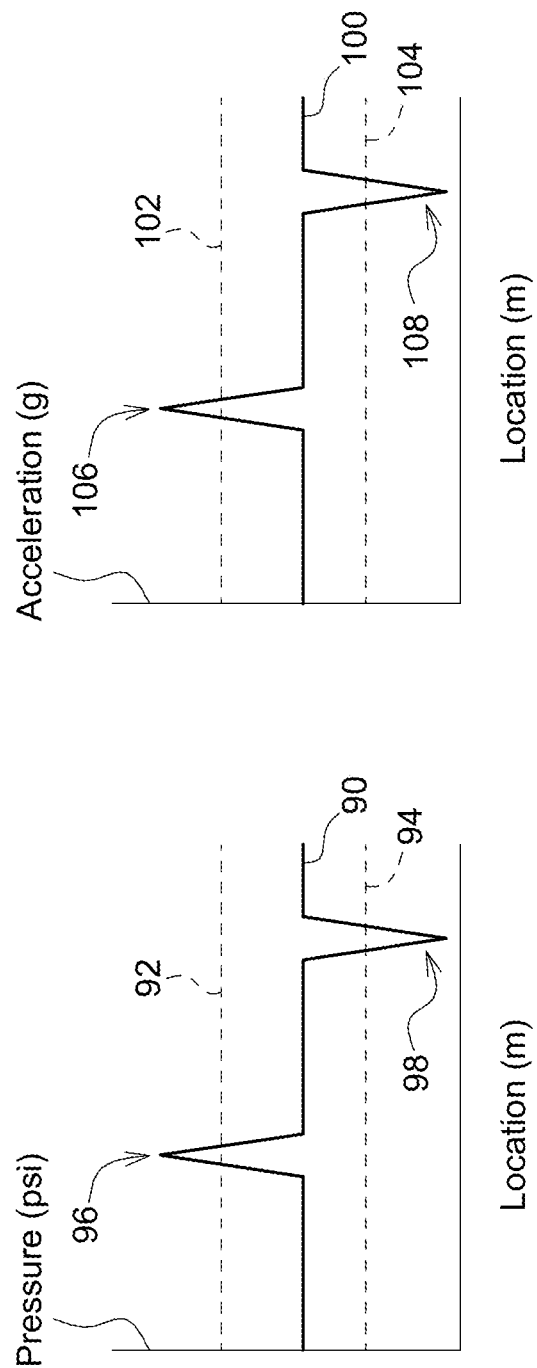
FIG. 8 is a graph showing a float pressure for the hydraulic systems of FIGS. 3 and 5.

FIG. 8 shows a graph depicting a detected float pressure 90 and float pressure upper and lower limits 92, 94 for a given float pressure setting, tilt position setting, header height, and header type. The float pressure upper and lower limits 92, 94 represent an acceptable range for the detected float pressure 90. As the header 14 moves up in response to a change in the ground surface 50 (FIG. 2), the detected float pressure 90 decreases. Conversely, as the header 14 moves down in response to a change in the ground surface 50, the detected float pressure 90 increases. A sharp rapid change in the detected float pressure 90 could be used to identify impact events. Slow changes in detected float pressure 90 may be used to identify undulating terrain. The graph further depicts a first event 96 in which the detected float pressure 90 exceeds the float pressure upper limit 92. The first event 96 is indicative of a hole or downwardly undulating terrain encountered by the header 14. The graph also depicts a second event 98 in which the detected float pressure 90 falls below the float pressure lower limit 94. The second event 98 is indicative of an obstacle (e.g., a rock) or upwardly undulating terrain encountered by the header 14.

Figure 9:
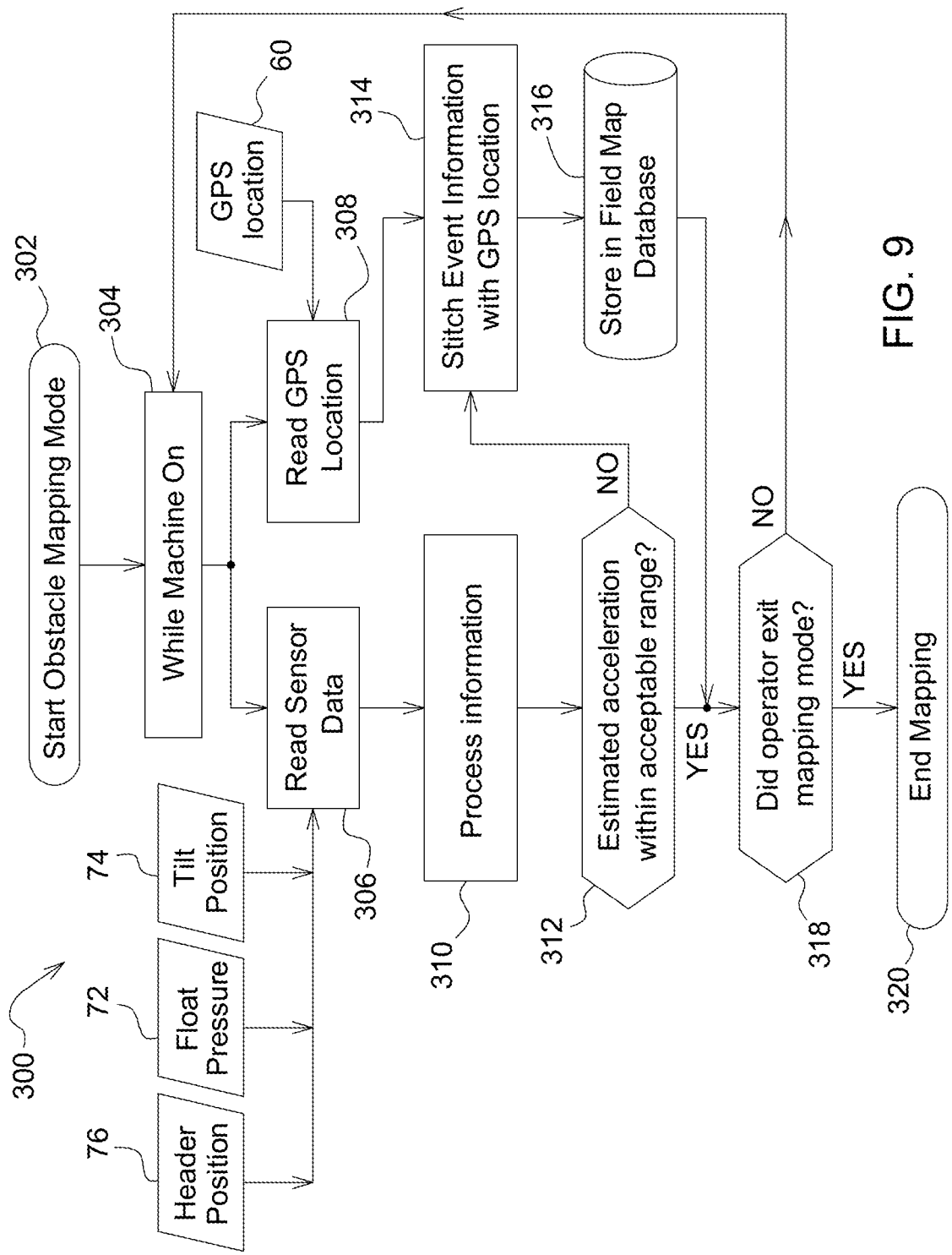
FIG. 9 is another flow chart of the obstacle detection and field mapping module for the control system.

FIG. 9 shows a partial flow diagram of a second set of instructions 300 to be executed by the controller 58 for detecting changes in the ground surface 50, such as obstacles 82 (FIG. 2) and undulating terrain, and providing a report or map, such as the field map 84 (FIG. 16). The controller 58 initially receives a start command to initiate an obstacle detection and mapping mode (step 302), e.g., via a switch or control screen input from the operator, and checks to verify that the windrower 10 is on (step 304). If the windrower 10 is on, the controller 58 reads signals received from the sensor unit 68 (step 306). The signals may include a header height detected or measured by one or more of the header height sensors 76, a float pressure detected by one or more of the float pressure sensors 72, and a header tilt position detected or measured by the tilt position sensor 74. Simultaneous to step 306, the controller 58 also monitors the GPS location of the windrower 10 (step 308) (e.g., supplied to the controller 58 via the communication module 60). The controller 58 then processes the signals to determine a header location and acceleration (step 310). Specifically, the controller 58 processes the signals from the tilt position sensor 74 and the one or more header height sensors 76 to determine the header location and orientation relative to the ground surface 50, and creates a transfer function of the four-bar linkage 48 (FIG. 2) to identify the location of a contact point between the header 14 and the ground surface 50. Based on this transfer function, the controller 58 estimates the acceleration of the header 14 when encountering changes in the ground surface 50, such as obstacles or undulating terrain. Next, the controller 58 determines whether the estimated acceleration is within an acceptable range for a given float pressure setting (set by the operator), tilt position, header height, and header type (step 312). The acceptable range may be determined by the controller 58 based at least in part on the signals received from the sensor unit 68. If the controller 58 determines that the estimated acceleration has moved outside the acceptable range, the controller 58 creates an event and stitches the event information with the GPS location (step 314) and stores the information in a field map database (step 316). If the controller 58 determines that the estimated acceleration remains within the acceptable range, the controller 58 checks for a stop command from the operator (step 318), and if a stop command was issued, the controller 58 ends the obstacle detection and mapping mode (step 320). If no stop command was issued, the controller 58 repeats steps 304-318. In some embodiments, the set of instructions 300 can be combined with the set of instructions 200 to provide a higher fidelity estimation of an event.

FIG. 10 shows a graph depicting an acceleration 100 of the header 14 and acceleration upper and lower limits 102, 104 for a given float pressure setting, tilt position, header height, and header type. The acceleration 100 may be an estimated acceleration such as that described above with respect to the set of instructions 300, or may be a detected acceleration (e.g., as detected by the accelerometer 78; FIG. 6). In some embodiments, the acceleration 100 is not of the header 14 itself but of a component that couples the header 14 to the chassis 16, such as the arms 24, the actuators 40, or other members or linkages. The acceleration upper and lower limits 102, 104 represent an acceptable range for the acceleration 100. The acceptable range may be determined by the controller 58 based at least in part on the signals received from the sensor unit 68. An acceleration 100 with a relatively large magnitude may indicate an impact event, whereas relatively low magnitude accelerations 100 may be indicative of undulating terrain. The graph further depicts a first event 106 in which the acceleration 100 exceeds the acceleration upper limit 102. The first event 106 is indicative of an obstacle (e.g., a rock) or upwardly undulating terrain encountered by the header 14. The graph also depicts a second event 108 in which the acceleration 100 falls below the acceleration lower limit 104. The second event 108 is indicative of a hole or downwardly undulating terrain encountered by the header 14.

Figure 11:
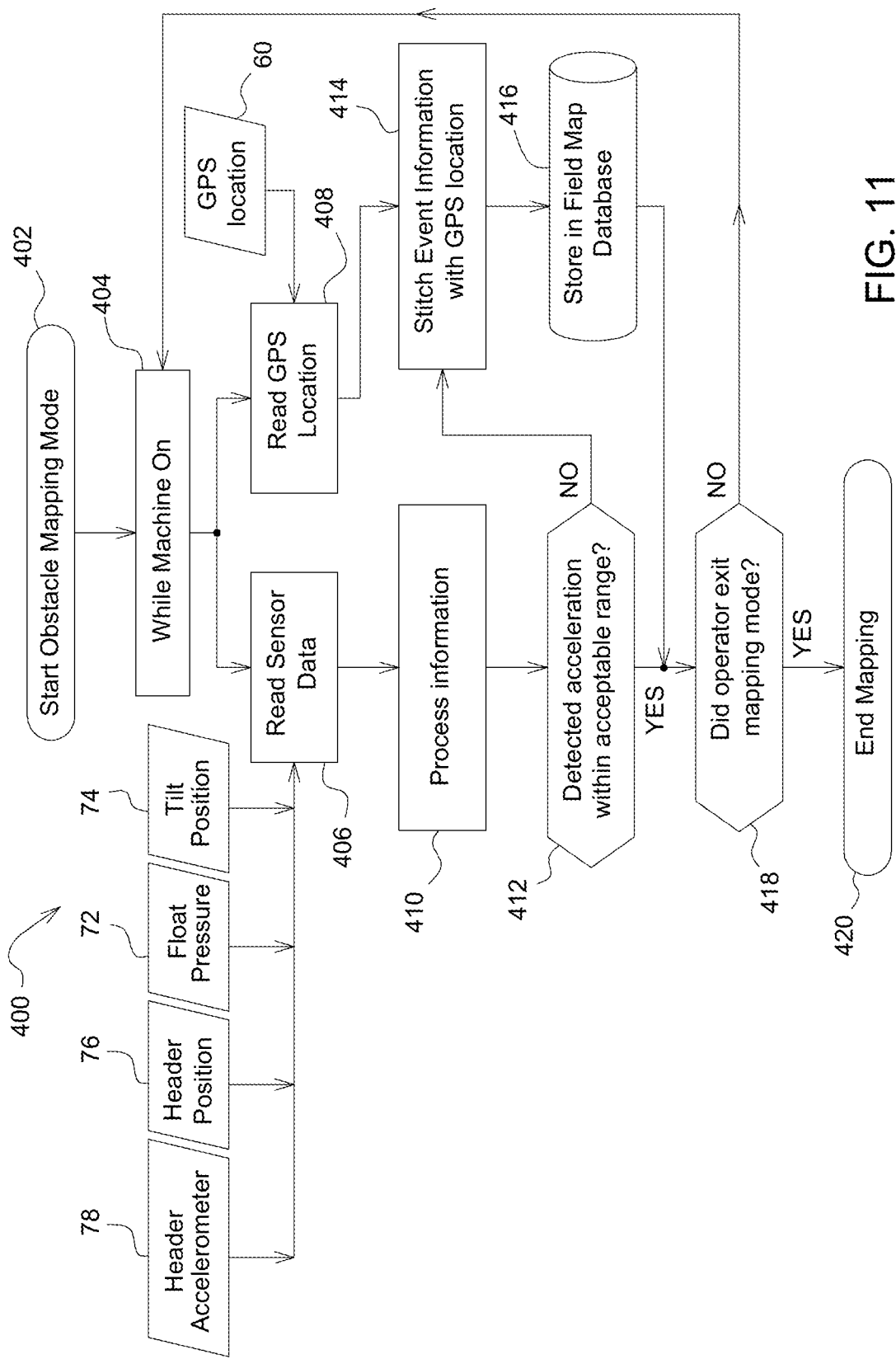
FIG. 11 is another flow chart of the obstacle detection and field mapping module for the control system.

FIG. 11 shows a partial flow diagram of a third set of instructions 400 to be executed by the controller 58 for detecting changes in the ground surface 50, such as obstacles 82 (FIG. 2) and undulating terrain, and providing a report or map, such as the field map 84 (FIG. 16). The set of instructions 400 is similar to the set of instructions 300 described above, and accordingly, the following description focuses primarily on the steps of the set of instructions 400 that differ from those of the set of instructions 300 described above. It should be understood that the features of the set of instructions 400 that are not explicitly described below have the same properties as the features of the set of instructions 300. Steps 402-404 are the same as steps 302-304 described above. At step 406, the controller 58 reads signals received from the sensor unit 68. In addition to a header height, a float pressure, and a header tilt position, the signals also include a header acceleration detected by the accelerometer 78 (FIG. 6). Concurrently with step 406, the controller 58 also monitors the GPS location of the windrower 10 (step 408) (e.g., supplied to the controller 58 via the communication module 60). The controller 58 then processes the signals to determine a header location and acceleration (step 410). Specifically, the controller 58 processes the signals from the tilt position sensor 74 and the one or more header height sensors 76 to determine the header location and orientation relative to the ground surface 50. But, rather than estimating the acceleration based on a transfer function as described above for the set of instructions 300, the controller 58 simply interprets the signal for the acceleration as directly measured by the accelerometer 78. In some embodiments, the acceleration is not of the header 14 itself but of a component that couples the header 14 to the chassis 16, such as the arms 24, the actuators 40, or other members or linkages. The controller then performs steps 412-420, which are identical to steps 312-320 and will not be repeated. In some embodiments, the set of instructions 400 can be combined with the set of instructions 200 to provide a higher fidelity estimation of an event.

Figure 12:
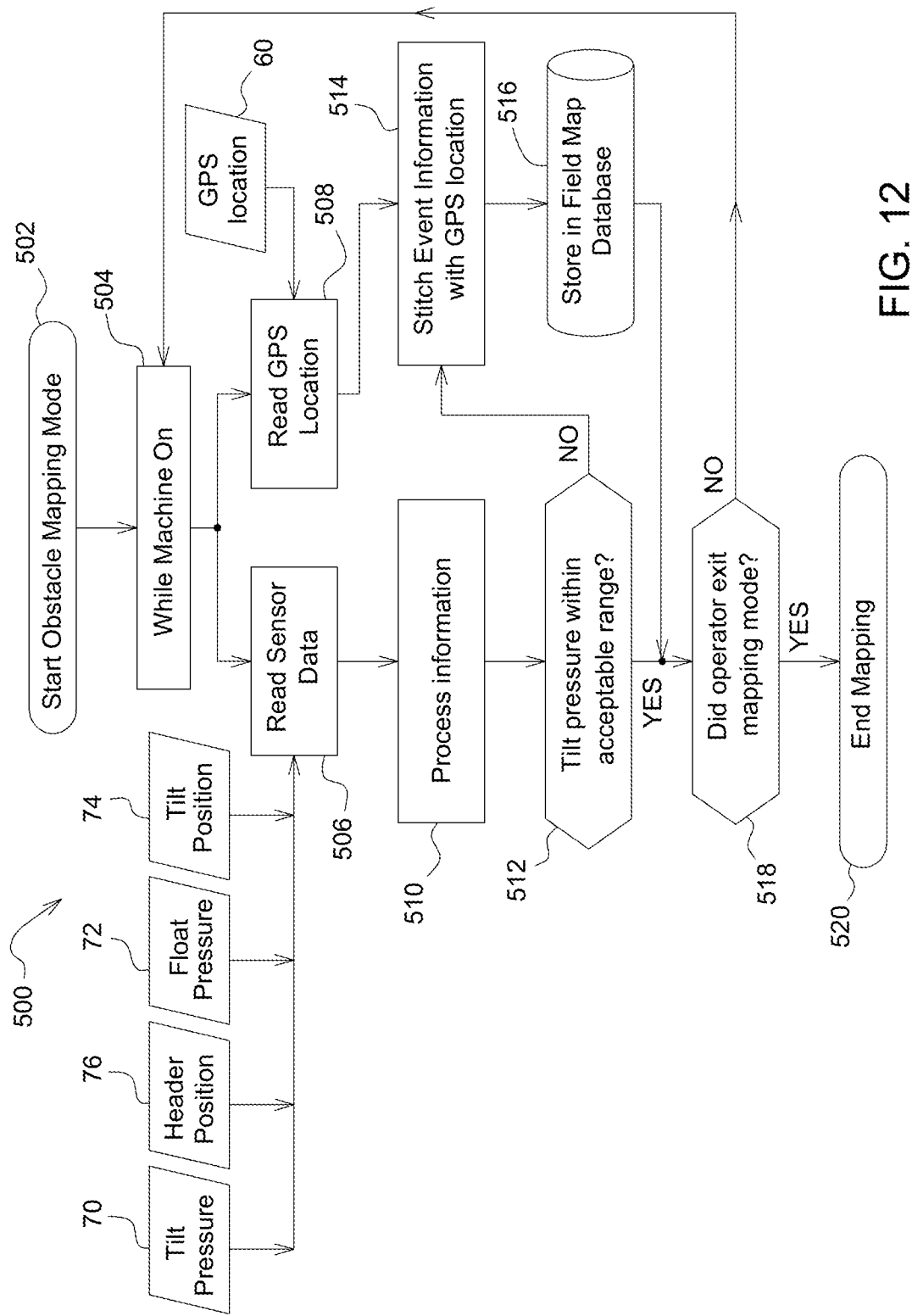
FIG. 12 is another flow chart of the obstacle detection and field mapping module for the control system.

FIG. 12 shows a partial flow diagram of a fourth set of instructions 500 to be executed by the controller 58 for detecting changes in the ground surface 50, such as obstacles 82 (FIG. 2) and undulating terrain, and providing a report or map, such as the field map 84 (FIG. 16). The controller 58 initially receives a start command to initiate an obstacle detection and mapping mode (step 502), e.g., via a switch or control screen input from the operator and checks to verify that the windrower 10 is on (step 504). Next, the controller 58 reads signals received from the sensor unit 68 (step 506). In addition to a header height, a float pressure, and a header tilt position, the signals also include a tilt pressure detected by the tilt pressure sensor 70 (FIG. 6). The tilt pressure is indicative of a load on the tilt cylinder 42 (FIG. 2). Concurrently with step 506, the controller 58 also monitors the GPS location of the windrower 10 (step 508) (e.g., supplied to the controller 58 via the communication module 60). The controller 58 then processes the signals to determine a header location and acceleration (step 510). Specifically, the controller 58 processes the signals from the tilt position sensor 74 and the one or more header height sensors 76 to determine the header location and orientation relative to the ground surface 50. Next, the controller 58 determines whether the detected tilt pressure is within an acceptable range for a given tilt position (set by the operator), header height, and header type (step 512). The acceptable range may be determined by the controller 58 based at least in part on the signals received from the sensor unit 68. If the controller 58 determines that the detected tilt pressure has moved outside the acceptable range, the controller 58 creates an event and stitches the event information with the GPS location (step 514) and stores the information in a field map database (step 516). If the controller 58 determines that the detected tilt pressure remains within the acceptable range, the controller 58 checks for a stop command from the operator (step 518), and if a stop command was issued, the controller 58 ends the obstacle detection and mapping mode (step 520). If no stop command was issued, the controller 58 repeats steps 504-518. In some embodiments, the set of instructions 500 can be combined with the sets of instructions 200, 300, and 400 described above to provide a higher fidelity estimation of an event.

Figure 13:
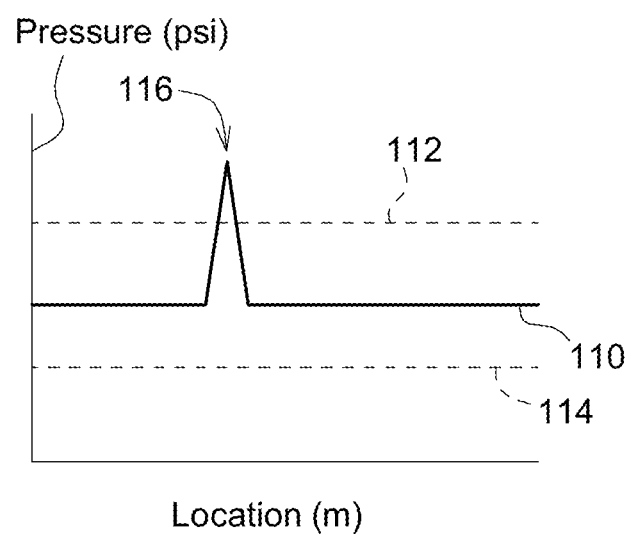
FIG. 13 is a graph showing a tilt pressure for the hydraulic systems.

FIG. 13 shows a graph depicting a detected tilt pressure 110 and tilt pressure upper and lower limits 112, 114 for a given tilt position setting, float pressure setting, header height, and header type. The tilt pressure upper and lower limits 112, 114 represent an acceptable range for the detected tilt pressure 110. The acceptable range may be determined by the controller 58 based at least in part on the signals received from the sensor unit 68. When an external load is imparted on the header 14 (e.g., due to impact with an obstacle or undulating terrain), a moment is created at the pivot point where the tilt cylinder 42 connects to the chassis 16. The tilt cylinder 42 acts as a member of the four-bar linkage 48 to counter this applied moment and thus the base end of the tilt cylinder 42 observes an increase in pressure. The graph depicts an event 116 in which the detected tilt pressure 110 exceeds the tilt pressure upper limit 112. The event 116 is indicative of an obstacle or upwardly undulating terrain encountered by the header 14. In other embodiments (not shown), a sensor may be used on a rod end of the tilt cylinder instead to capture a decrease in tilt pressure when an obstacle or upwardly undulating terrain is encountered by the header 14.

Figure 14:
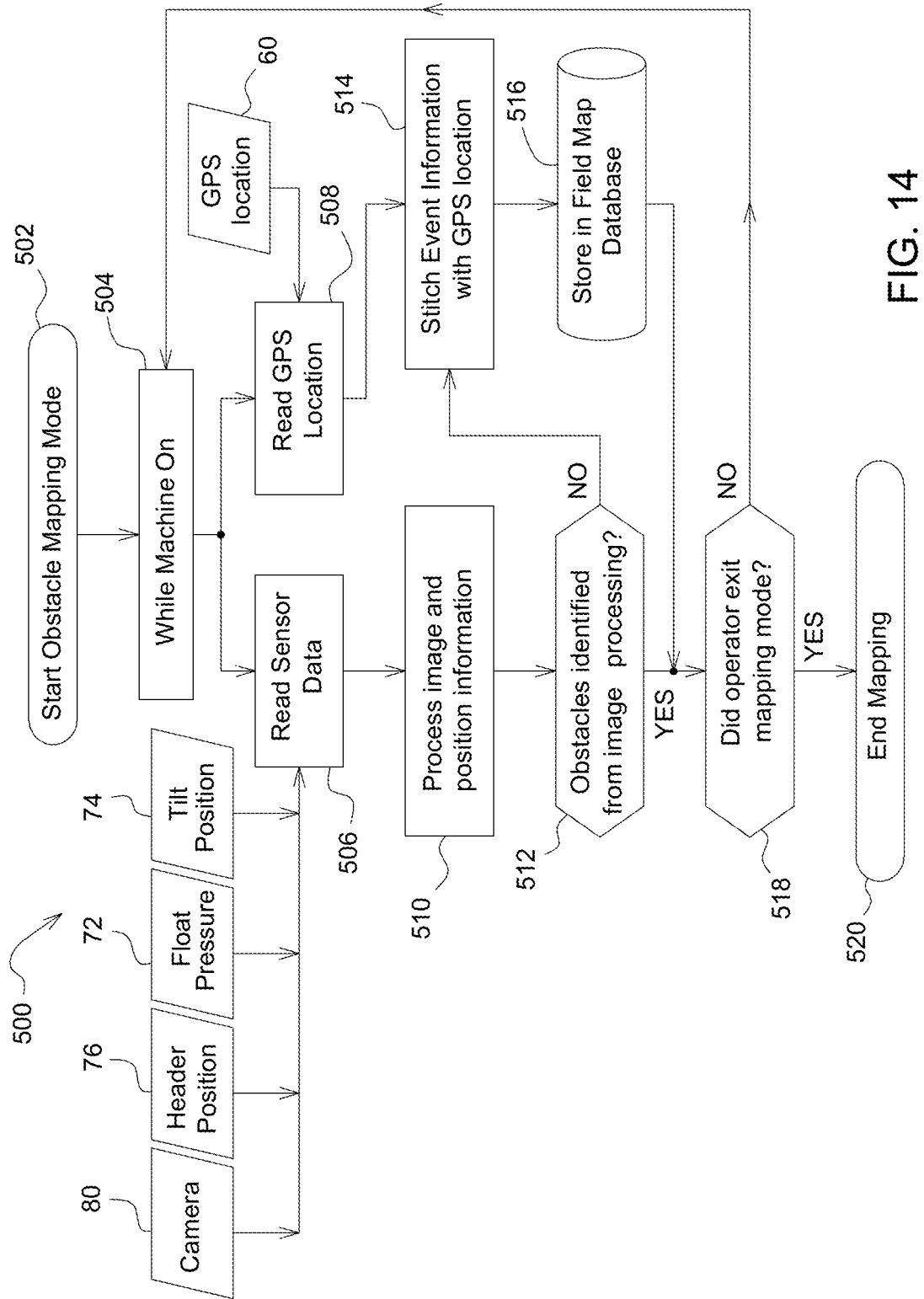
FIG. 14 is another flow chart of the obstacle detection and field mapping module for the control system.

FIG. 14 shows a partial flow diagram of a fifth set of instructions 600 to be executed by the controller 58 for detecting changes in the ground surface 50, such as obstacles 82 (FIG. 2) and undulating terrain, and providing a report or map, such as the field map 84 (FIG. 16). The controller 58 initially receives a start command to initiate an obstacle detection and mapping mode (step 502), e.g., via a switch or control screen input from the operator and checks to verify that the windrower 10 is on (step 604). Next, the controller 58 reads signals received from the sensor unit 68 (step 606). In addition to a header height, a float pressure, and a header tilt position, the signals also include an image signal generated by the camera 80 (FIG. 6). Concurrently with step 606, the controller 58 also monitors the GPS location of the windrower 10 (step 608) (e.g., supplied to the controller 58 via the communication module 60). The controller 58 then processes the signals to determine a header location and acceleration (step 610). Specifically, the controller 58 processes the signals from the tilt position sensor 74 and the one or more header height sensors 76 to determine the header location and orientation relative to the ground surface 50. The controller 58 also performs image processing based on the image signal to provide an image of any obstacles or undulating terrain to the work machine or the operator for further identification and decision making. Based on the processed image signal, the controller 58 determines whether an event has occurred (step 612). If the controller 58 determines from the processed image signal that an obstacle or undulating terrain was encountered by the header 14, the controller 58 creates an event and stitches the event information with the GPS location (step 614) and stores the information in a field map database (step 616). The controller 58 may also determine if the obstacle is located within the recently cut or harvested crop such as a windrow. If the controller 58 determines that no obstacle or undulating terrain was encountered, the controller 58 checks for a stop command from the operator (step 618), and if a stop command was issued, the controller 58 ends the obstacle detection and mapping mode (step 620). If no stop command was issued, the controller 58 repeats steps 604-618. In some embodiments, the set of instructions 600 can be combined with the sets of instructions 200, 300, 400, and 500 described above to provide a higher fidelity estimation of an event.

Figure 15:
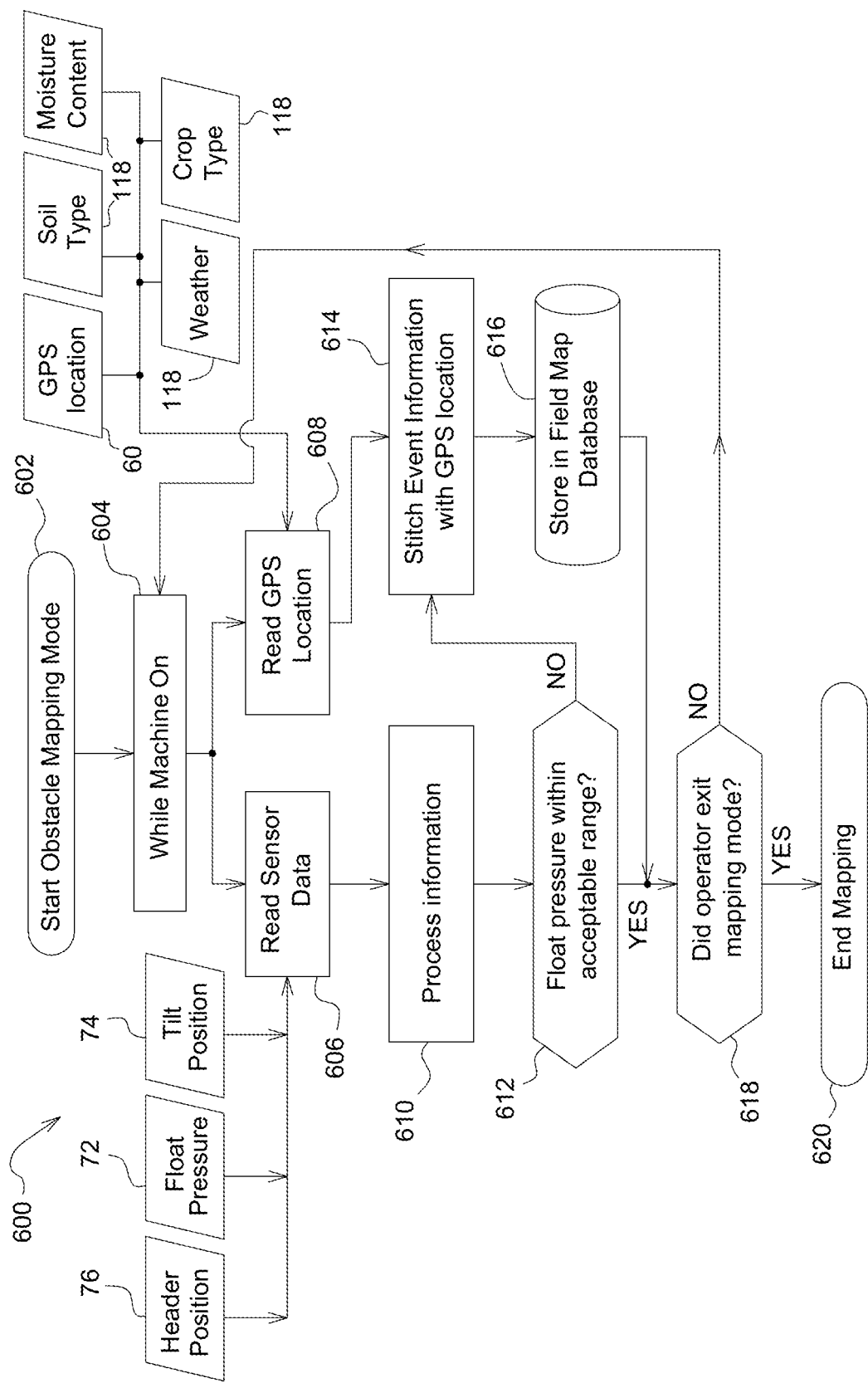
FIG. 15 is another flow chart of the obstacle detection and field mapping module for the control system.

FIG. 15 shows a partial flow diagram of a sixth set of instructions 700 to be executed by the controller 58 for detecting changes in the ground surface 50, such as obstacles 82 (FIG. 2) and undulating terrain, and providing a report or map, such as the field map 84 (FIG. 16). The set of instructions 700 utilizes many of the same inputs, steps, and processes as the sets of instructions 200-600 described above, but further accounts for various external variables 118 (e.g., weather, soil type, soil moisture, crop type, crop moisture, crop yield, etc.) to provide higher fidelity estimation of an event. The set of instructions 700 utilizes signals including header height, float pressure, and tilt position to detect events and provides a report or map in a manner similar to the set of instructions 200 described above. Specifically, steps 702-720 are identical to the steps 202-220 described above, with the following exceptions. At step 708, in addition to monitoring the GPS location of the windrower 10, the controller 58 also monitors the external variables 118 including weather, soil type, soil moisture, crop type, crop moisture, crop yield (obtained via, e.g., onboard sensors, operator input, communication with a remote server (not shown) via the communication module 60, etc.). At step 714, the controller 58 creates an event and stitches the event with the GPS location, and with information including one or more of the external variables 118, to provide a field map specific to the external conditions. Although the set of instructions 700 utilizes float pressure to identify events in a manner similar to the set of instructions 200 described above, the steps 708, 714 involving the external variables 118 are equally applicable to the sets of instructions 300, 400, 500, and 600 described above.

FIG. 16 schematically illustrates one embodiment of a field map 84 that can be generated by the controller 58 via the obstacle detection and mapping module 86 that executes one or more of the sets of instructions 200-700 described above. The field map 84 can be displayed on, e.g., the control screen 66 (FIG. 17) in the cab 20 and referenced by the operator during operation of the windrower 10. The field map 84 comprises a graphical representation of a field to be cut by the windrower 10, and includes a start location 120, an end location 122, and a path of travel 124 traversed by the windrower 10 between the start and end locations 120, 122. The path of travel 124 is divided into rows 126. The field map 84 also includes events 128a-128d located at discrete locations along the rows 126 of the path of travel 124. A first event 128a may include a "high impact" event representative of a large obstacle previously identified and stored in the field map database via the obstacle detection and mapping module 86 (FIG. 6). A second event 128b may include an "undulating terrain" event, a third event 128c may include a "hole" event, and a fourth event 128d may include a "medium impact" event. The field map 84 may be used by the operator or the work machine to make adjustments during operation of the windrower 10, e.g., adjust the float pressure, the header tilt, the header height, etc. based on the location and associated information for each event 44a-44d.

Figure 17:
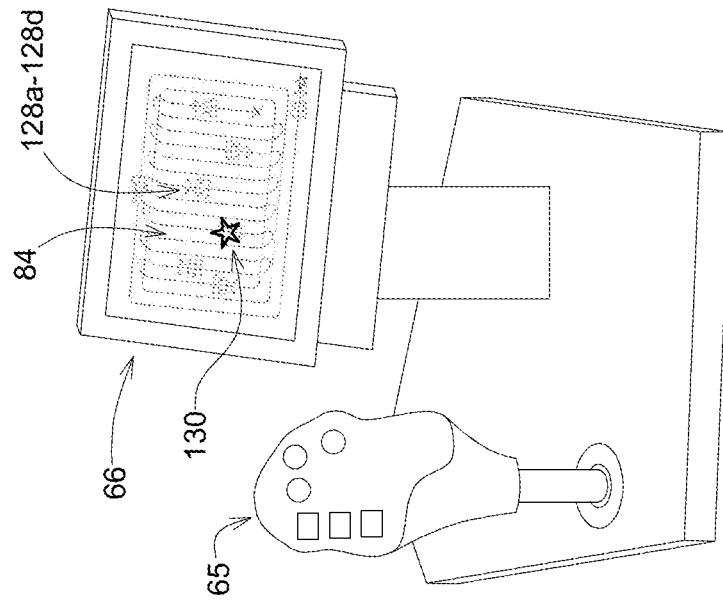
FIG. 17 is a perspective view of a control screen and various operator input mechanisms of the windrower of FIG. 1.

FIG. 17 illustrates the operator input mechanisms 65 and the control screen 66 located inside the cab 20. The field map 84 may be displayed to the operator via the control screen 66, including the start location 120, the end location 122, the path of travel 124, the rows 126, and the events 128a-128d. In addition, the controller 58 may be configured to display an alert 130 associated with one of the events 128a-128d to alert the operator when the windrower 10 is approaching the event. In other embodiments, the field map 84 may be viewed from other devices, e.g., from a smartphone, a remote computer, etc.

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present disclosure, and are not intended to limit the structure of the exemplary embodiments of the present disclosure to any particular position or orientation. Terms of degree, such as "substantially" or "approximately" are understood by those of ordinary skill to refer to reasonable ranges outside of the given value, for example, general tolerances or resolutions associated with manufacturing, assembly, and use of the described embodiments and components.

What is claimed is:

1. A work machine comprising:
a chassis;
a work implement movably coupled to the chassis, the work implement configured to perform a field-engaging function;
a hydraulic actuator coupled to the work implement and configured to adjust a position of the work implement relative to a ground surface;
a controller in communication with a sensor unit and a communication module, the controller configured to
monitor a location of the work machine via the communication module,
at least one of:
receive a signal from the sensor unit indicative of a load acting on the hydraulic actuator, determine whether the load exceeds an acceptable load range, and in response to the load exceeding the acceptable load range, identify an event,
or
receive a signal from the sensor unit indicative of an acceleration of the work implement, determine whether the acceleration of the work implement exceeds an acceptable acceleration range, and in response to the acceleration of the work implement exceeding the acceptable acceleration range, identify an event,
assign a location to the event, and
store the event and the assigned location in a field map database.

2. The work machine of claim 1, wherein the sensor unit senses a pressure of a hydraulic fluid acting within the hydraulic actuator.

3. The work machine of claim 1, wherein the hydraulic actuator comprises a tilt cylinder configured to adjust a tilt angle formed between a cutter bar of the work implement and the ground surface.

4. The work machine of claim 1, wherein the hydraulic actuator comprises a float cylinder configured to adjust a float pressure of the work implement.

5. The work machine of claim 1, wherein the hydraulic actuator comprises a lift cylinder configured to adjust a height of the work implement measured relative to the ground surface.

6. A work machine comprising:
a chassis;
a work implement movably coupled to the chassis, the work implement configured to perform a field-engaging function;
a hydraulic actuator coupled to the work implement and configured to adjust a position of the work implement relative to a ground surface;
a sensor unit configured to sense a characteristic of the work machine and communicate a signal indicative of the characteristic;
a communication module; and
a controller in communication with the sensor unit and the communication module, the controller configured to
monitor a location of the work machine via the communication module,
process the signal from the sensor unit to monitor the characteristic,
determine whether the characteristic exceeds an acceptable range, and in
response to the characteristic exceeding the acceptable range, identify an event, and
assign a location to the event;
wherein the characteristic includes one or more of
a load acting on the hydraulic actuator,
an acceleration of the work implement, and
an acceleration of a component that couples the work implement to the chassis.

7. The work machine of claim 6, wherein the sensor unit senses a pressure of a hydraulic fluid acting within the hydraulic actuator.

8. The work machine of claim 6, wherein:
the characteristic comprises a first characteristic, the signal comprises a first signal, and the sensor unit is further configured to sense a second characteristic of the work machine and communicate a second signal indicative of the second characteristic; and
the controller is further configured to process the second signal from the sensor unit to monitor the second characteristic.

9. The work machine of claim 8, wherein the controller is further configured to determine the acceptable range at least partially based on the second characteristic.

10. The work machine of claim 9, wherein the second characteristic comprises a tilt position of the work implement measured relative to the ground surface.

11. The work machine of claim 9, wherein the second characteristic comprises a height of the work implement measured relative to the ground surface.

12. The work machine of claim 6, wherein the hydraulic actuator comprises a tilt cylinder configured to adjust a tilt angle formed between a cutter bar of the work implement and the ground surface.

13. The work machine of claim 6, wherein the hydraulic actuator comprises a float cylinder configured to adjust a float pressure of the work implement.

14. The work machine of claim 6, wherein the hydraulic actuator comprises a lift cylinder configured to adjust a height of the work implement measured relative to the ground surface.

15. A control system for a work machine, the work machine including a chassis, a work implement movably coupled to the chassis, the work implement configured to perform a field-engaging function, and a hydraulic actuator coupled to the work implement and configured to adjust a position of the work implement relative to a ground surface, the control system comprising:
a sensor unit configured to sense a characteristic of the work machine and communicate a signal indicative of the characteristic;
a communication module; and
a controller in communication with the sensor unit and the communication module, the controller configured to
monitor a location of the work machine via the communication module,
process the signal from the sensor unit to monitor the characteristic,
determine whether the characteristic exceeds an acceptable range, and in
response to the characteristic exceeding the acceptable range, identify an event, and
assign a location to the event;
wherein the characteristic includes one or more of
a load acting on the hydraulic actuator,
an acceleration of the work implement, and
an acceleration of a component that couples the work implement to the chassis.

16. The work machine of claim 15, wherein:
the characteristic comprises a first characteristic, the signal comprises a first signal, and the sensor unit is further configured to sense a second characteristic of the work machine and communicate a second signal indicative of the second characteristic; and
the controller is further configured to process the second signal from the sensor unit to monitor the second characteristic.

17. The work machine of claim 16, wherein the controller is further configured to determine the acceptable range at least partially based on the second characteristic, and wherein the second characteristic comprises a tilt position of the work implement measured relative to the ground surface.

18. The work machine of claim 15, wherein the controller is further configured to monitor an external variable and assign the external variable to the event, and wherein the external variable includes at least one of: a weather condition, a soil type, a crop type, a crop moisture, and a crop yield.

* * * * *